(12) United States Patent
Shimizu et al.

(10) Patent No.: US 8,737,041 B2
(45) Date of Patent: *May 27, 2014

(54) CAPACITOR AND METHOD OF MANUFACTURING THE SAME

(75) Inventors: Toshiaki Shimizu, Nara (JP); Kiyoshi Shibuya, Osaka (JP); Takumi Yamaguchi, Kyoto (JP); Kouji Ueoka, Nara (JP); Ichiro Aoki, Osaka (JP)

(73) Assignee: Panasonic Corporation, Osaka (JP)

( * ) Notice: Subject to any disclaimer, the term of this patent is extended or adjusted under 35 U.S.C. 154(b) by 307 days.

This patent is subject to a terminal disclaimer.

(21) Appl. No.: 13/307,199

(22) Filed: Nov. 30, 2011

(65) Prior Publication Data

US 2012/0120550 A1    May 17, 2012

Related U.S. Application Data

(63) Continuation of application No. 12/566,057, filed on Sep. 24, 2009, now Pat. No. 8,130,487.

(30) Foreign Application Priority Data

Sep. 30, 2008 (JP) .................. 2008-253119

(51) Int. Cl.
  *H01G 9/08* (2006.01)
(52) U.S. Cl.
  USPC ........... 361/519; 361/516; 361/517; 361/525; 361/528; 361/535
(58) Field of Classification Search
  None
  See application file for complete search history.

(56) References Cited

U.S. PATENT DOCUMENTS

| 6,222,720 | B1 | 4/2001 | Aoki et al. |
| 6,310,756 | B1 | 10/2001 | Miura et al. |
| 6,896,993 | B2 | 5/2005 | Hozumi et al. |
| 7,286,335 | B2 | 10/2007 | Hozumi et al. |
| 7,474,520 | B2 | 1/2009 | Kashihara et al. |
| 8,130,487 | B2 * | 3/2012 | Shimizu et al. ............ 361/519 |
| 2006/0156521 | A1 | 7/2006 | Miura et al. |
| 2009/0239139 | A1 | 9/2009 | Kozuki et al. |
| 2009/0296316 | A1 | 12/2009 | Shimizu et al. |

FOREIGN PATENT DOCUMENTS

| JP | 04-327385 A | 11/1992 |
| JP | 10-022181 A | 1/1998 |
| JP | 2000-058038 A | 2/2000 |
| JP | 2004-134632 A | 4/2004 |
| JP | 2006-210562 A | 8/2006 |
| JP | 2006-313795 A | 11/2006 |
| JP | 2008-103672 A | 5/2008 |
| JP | 2008-227472 A | 9/2008 |

* cited by examiner

*Primary Examiner* — Nguyen T Ha
(74) *Attorney, Agent, or Firm* — Pearne & Gordon LLP

(57) ABSTRACT

A capacitor includes a capacitor element, a collector plate joined to an electrode of the capacitor element, and a case accommodating the capacitor element and the collector plate. An inner surface of a bottom plate of the case has a contacting portion contacting the collector plate and a junction portion facing the collector plate. The junction portion of the inner surface of the bottom plate has a joining point joined to the collector plate and a separation part facing the collector plate around the joining point by a gap between the junction portion and the collector plate. The collector plate is located away from the contacting portion.

17 Claims, 17 Drawing Sheets

CAPACITOR AND METHOD OF MANUFACTURING THE SAME

This application is a continuation of U.S. patent application Ser. No. 12/566,057, filed on Sep. 24, 2009, which is incorporated herein by referenced in its entirety.

FIELD OF THE INVENTION

The present invention relates to a capacitor used for regenerating or for storing electricity in various electronic devices or hybrid electric vehicles, and to a method of manufacturing the capacitor.

BACKGROUND OF THE INVENTION

FIG. 16 is a cross-sectional view of a conventional capacitor disclosed in JP2004-134632A. Capacitor element 20 has hollow 20A provided therein. A positive electrode and a negative electrode are taken out from both ends of capacitor element 20. Metal case 21 made of aluminum accommodates capacitor element 20 and an electrolyte solution therein. Negative electrode 21A is provided at an outer bottom surface of metal case 21. An end surface of the negative electrode of capacitor element 20 is connected mechanically and electrically to an inner bottom surface of metal case 21 by laser welding while protrusion 21B provided on the inner bottom surface of metal case 21 is put into hollow 20A of capacitor element 20. Sealing plate 22 is made of aluminum. Positive electrode terminal 22A is placed at an outer surface of sealing plate 22. Protrusion 22B is provided on an inner surface of sealing plate 22. Sealing plate 22 has hole 22C for putting the electrolyte solution in the case. The end surface of the positive electrode of capacitor element 20 is connected mechanically and electrically to an inner surface of sealing plate 22 by laser welding. An opening of metal case 21 and sealing plate 22 are sealed with a curling process of curling the opening of metal case 21 with a fringe of sealing plate 22. Pressure regulation valve 23 is attached on an outer surface of sealing plate 22

FIG. 17 is a cross-sectional view of pressure regulation valve 23. Pressure regulation valve 23 includes gas-permeable element 24 closing hole 22C, closing element 25 placed on gas-permeable element 24, and metal cap 26 which covers gas-permeable element 24 and closing element 25 and which is fixed to sealing plate 22. Metal cap 26 has hole 26A for communicating gas-permeable element 24 and closing element 25 with outside. Metal cap 26 urges closing element 25 toward hole 22C so that closing element 25 pushes gas-permeable element 24 to cause gas-permeable element 24 to close hole 22C. Sealing plate 22 has protrusion 22D having an annular shape surrounding hole 22C. Protrusion 22D is deformed by a caulking process to be pressed onto metal cap 26, thereby fixing metal cap 26 to sealing plate 22.

When the pressure of gas in metal case 21 exceeds a predetermined level, pressure regulation valve 23 releases the gas to an outside through hole 22C and 26A, and closes hole 22C again when the pressure falls below the predetermined level, namely the regulation valve is a self-restoring type. Thus, even when gas produced in metal case 21 raises the pressure, no abnormality is caused with an appearance of capacitor 501, and performance of the capacitor remains unchanged.

Gas-permeable element 24 closing hole 22C and intimately pressed onto sealing plate 22 does not permeate the electrolyte solution but permeates the gas produced in metal case 21. Consequently, the electrolyte solution is not attached to closing element 25, thus not damaging pressure regulation valve 23. The electrolyte solution is prevented from leaking through pressure regulation valve 23 to an outside of the capacitor, thus providing capacitor 501 with high reliability.

The end surface of capacitor element 20 of conventional capacitor 501 is welded to the inner surface of sealing plate 22 and the inner bottom surface of metal case 21 with laser radiated from an outside of metal case 21. Consequently, it is difficult to check the welding status and an unnecessary resistance may be increased due to variation in welding condition. A pin hole causing the electrolyte solution to leak may be formed in gas-permeable element 24 or in closing element 25 by sputtering of welding process. In addition, the laser radiated to small areas for welding, accordingly deteriorating reliability in connecting capacitor element 20 to metal case 21 or to sealing plate 22.

SUMMARY OF THE INVENTION

A capacitor includes a capacitor element including first and second electrodes, an electrolyte solution, first and second collector plates made of metal and joined to the first and second electrodes of the capacitor element, respectively, a case accommodating the capacitor element, the electrolyte solution, the first and second collector plates, a terminal plate placed at an opening of the case and joined to the second collector plate, and a sealing rubber sealing the terminal plate and the opening of the case. The case has a tubular portion and a bottom plate closing the tubular portion. An inner surface of the bottom plate of the case has a contacting portion contacting the first collector plate and a junction portion facing the first collector plate. The first junction portion of the inner surface of the bottom plate has a joining point joined to the first collector plate and a separation part facing the first collector plate around the first joining point by a first gap between the first junction portion and the first collector plate. The first collector plate is located away from the first contacting portion.

The capacitor has a high reliability in connecting the electrodes, preventing an unnecessary resistance or a pin hole produced in the case.

DETAILED DESCRIPTION OF PREFERRED EMBODIMENT

Figure 1A:
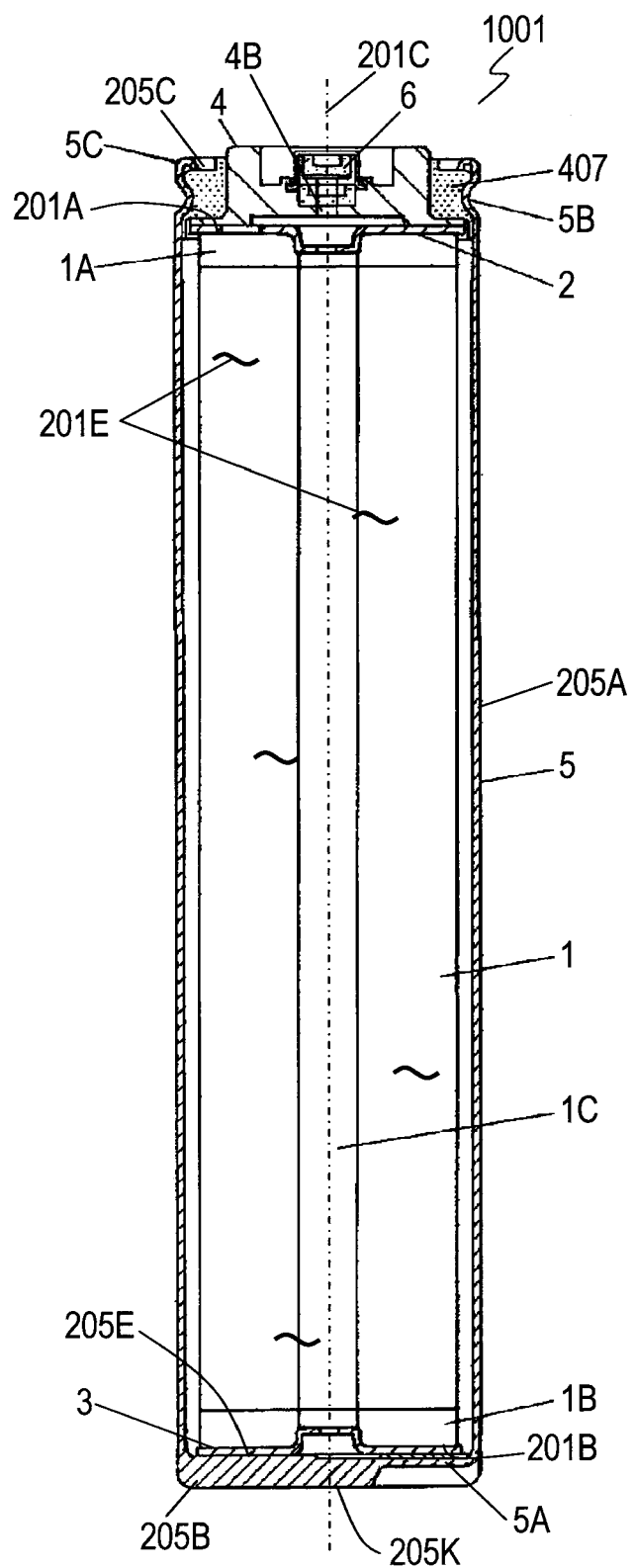
FIG. 1A is a cross-sectional view of a capacitor according to an exemplary embodiment of the present invention.
Figure 1B:
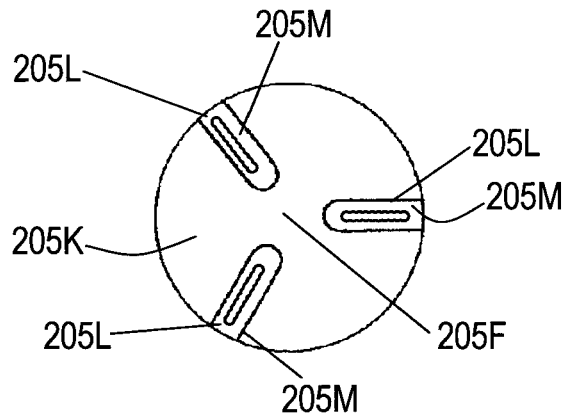
FIG. 1B is a bottom view of the capacitor according to the embodiment.
Figure 2:
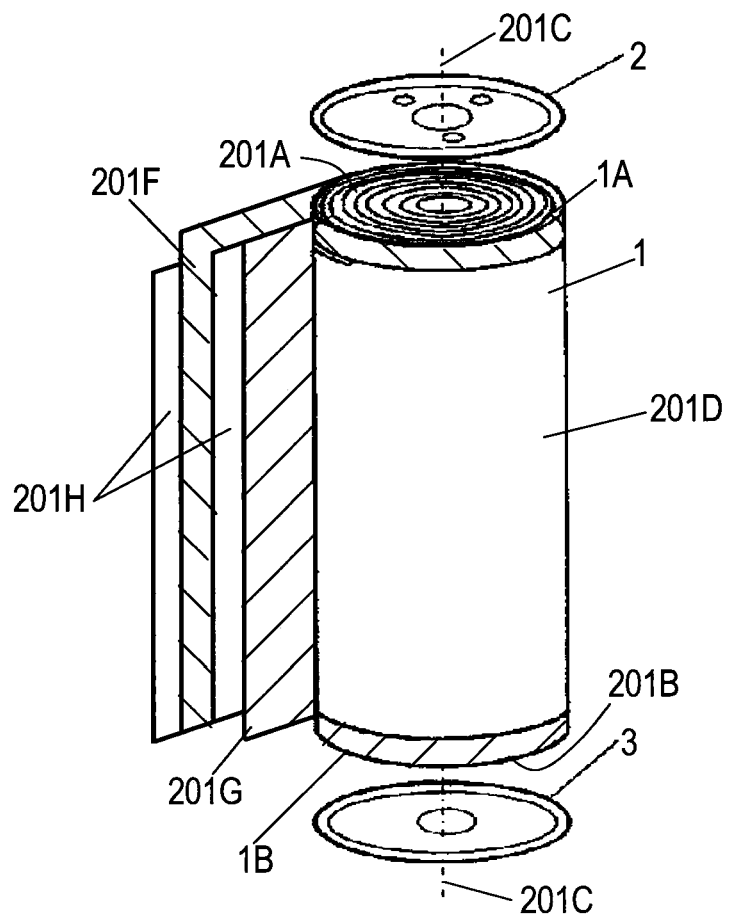
FIG. 2 is a perspective view of a capacitor element according to the embodiment.
Figure 3:
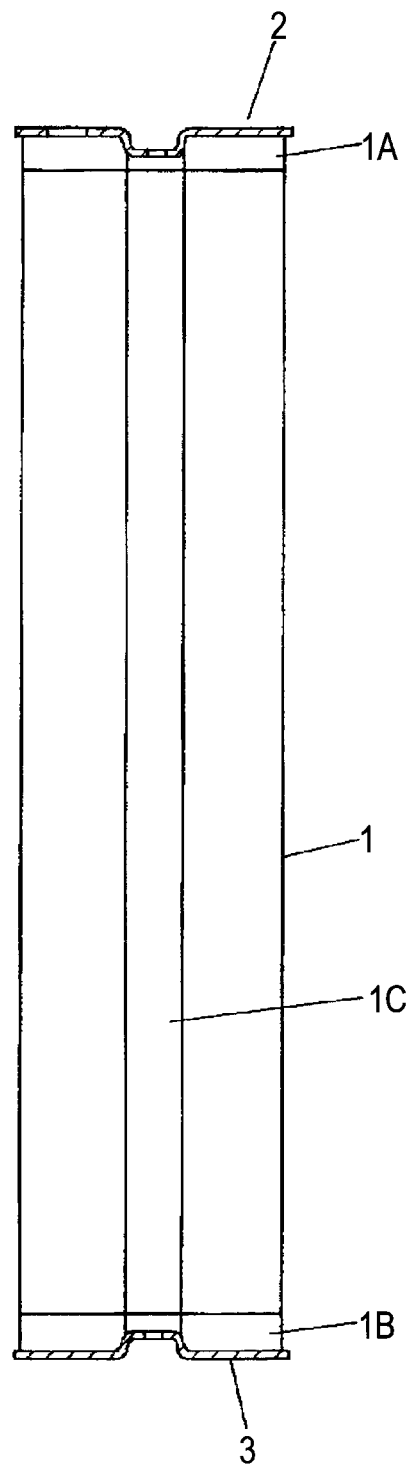
FIG. 3 is a side view of the capacitor element according to the embodiment.
Figure 4:
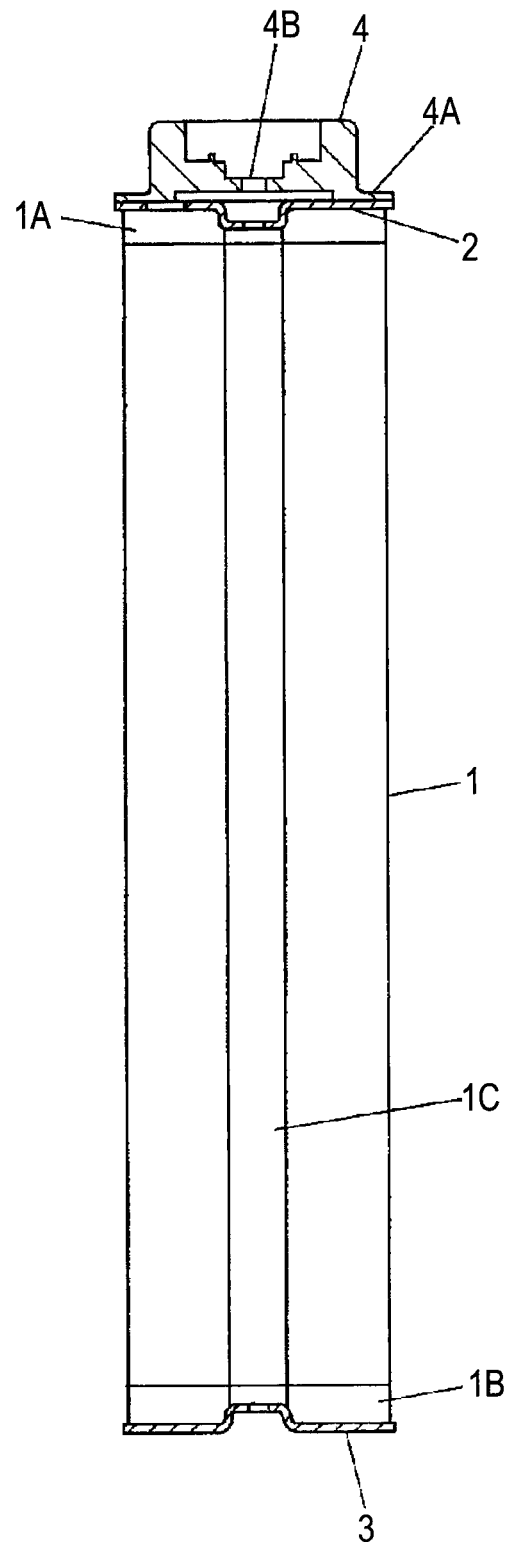
FIG. 4 is a side view of the capacitor element according to the embodiment.

FIGS. 1A and 1B are a cross-sectional view and a bottom view of capacitor 1001 according to an exemplary embodiment of the present invention, respectively. FIG. 2 is a perspective view of capacitor element 1 of capacitor 1001. FIGS. 3 and 4 are side views of capacitor element 1. Capacitor element 1 extending along center axis 201C has hollow 1C therein extending along center axis 201C. Capacitor element 1 has end surface 201A (a second end surface) and end surface 201B (a first end surface) opposite to each other along center axis 201C, and side surface 201D extending in parallel with center axis 201C. Positive electrode 1A as an electrode (a second electrode) is provided at end surface 201A, and negative electrode 1B as an electrode (a first electrode) is provided at end surface 201B. Positive collector plate 2 (a second collector plate) faces end surface 201A of capacitor element 1 and is joined to positive electrode 1A mechanically and electrically by laser welding. Negative collector plate 3 (a first collector plate) faces end surface 201B and is joined to negative electrode 1B mechanically and electrically by laser welding. Positive collector plate 2 and negative collector plate 3 are made of aluminum plates. Terminal plate 4 made of metal, such as aluminum, is connected to positive collector plate 2. Case 5 made of metal, such as aluminum, has bottom plate 205B and tubular portion 205A having a cylindrical shape extending along center axis 201C. Tubular portion 205A has opening 205C located on center axis 201C. Terminal plate 4 is placed at opening 205C. Bottom plate 205B closes tubular portion 205A. Case 5 accommodates capacitor element 1 having positive collector plate 2, negative collector plate 3, and terminal plate 4 attached thereto together with electrolyte solution 201E. Bottom plate 205B faces negative electrode 1B at end surface 201B of capacitor element 1. Inner surface 205E of bottom plate 205B of case 5 has junction portion 5A. As shown in FIG. 1B, plural recesses 205L are provided in a portion of outer surface 205K of bottom plate 205B opposite to junction portion 5A. Recesses 205L extends radially from center 205F of outer surface 205K with equal angular intervals. According to the embodiment, three recesses 205L extend elongatedly from center 205F by angular intervals of 120° about center 205F. The number of recesses 205L is not necessarily three. Laser is radiated to bottom 205M of recess 205L so as to weld junction portion 5A to negative collector plate 3.

Terminal plate 4 has hole 4B therein for putting electrolyte solution 201E in. Pressure regulation valve 6 is connected to terminal plate 4 to close terminal plate 4. Sealing rubber 407 made of insulating rubber is placed at opening 205C of metal case 5 to sealing opening 205C of case 5.

As shown in FIG. 2, capacitor 1 element 1 includes electrode foils 201F and 201G, and separator 201H which is provided between electrode foils 201F and 201G and which has an insulating property. Electrode foils 201F and 201G and separator 201F which are stacked are rolled about center axis 201C and provide hollow 1C along center axis 201C. Each of electrode foils 201F and 201G has a collector body made of aluminum foil and a polarized electrode layer provided on the collector body. The polarized electrode layers of electrode foils 201F and 201G face each other across separator 201H. Electrode foils 201F and 201G deviate from each other in opposite directions along center axis 201C. That is, electrode foil 201F is exposed to end surface 201A of capacitor element 1 while electrode foil 201G and separator 201H are not exposed to end surface 201A. Electrode foil 201G is exposed to end surface 201B while electrode foil 201F and separator 201H are not exposed to end surface 201B. Namely, positive electrode 1A is implemented by electrode foil 201F exposed from end surface 201A, and negative electrode 1B is implemented by electrode foil 201G exposed from end surface 201B.

Figure 5A:
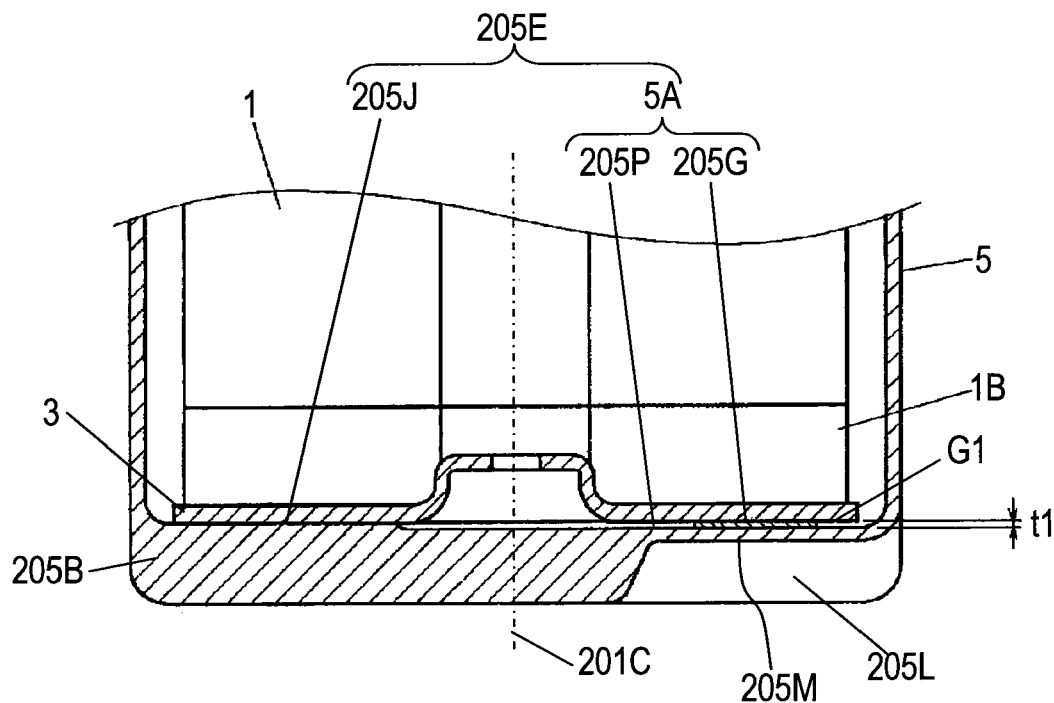
FIGS. 5A and 5B are enlarged cross-sectional views of the capacitor according to the embodiment.
Figure 5B:
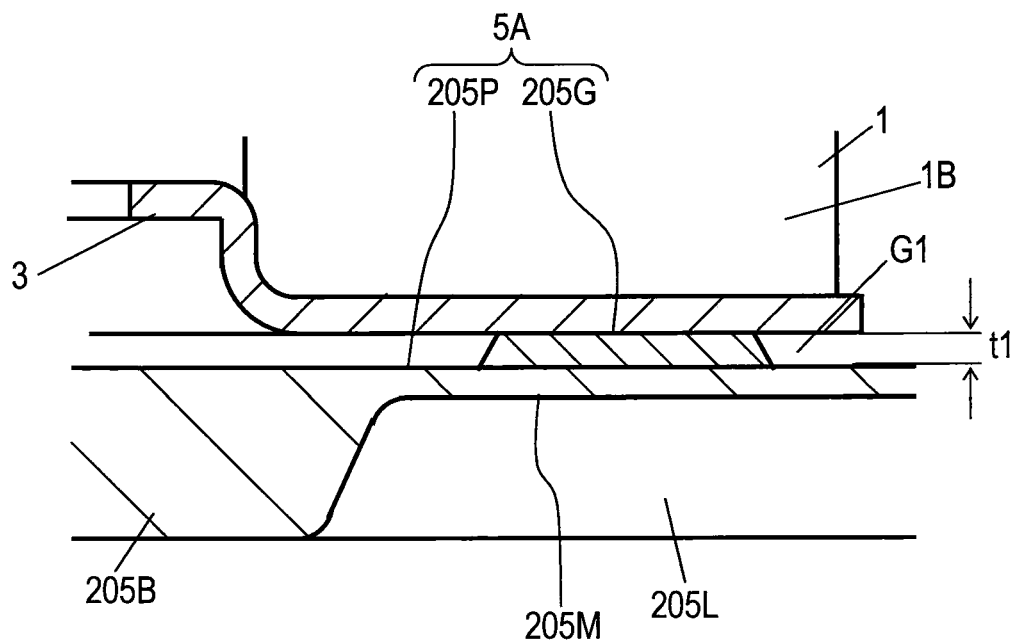

FIGS. 5A and 5B are enlarged expanded cross-sectional views of capacitor 1001 for illustrating a vicinity of bottom plate 205B of case 5. Capacitor element 1 having positive collector plate 2, negative collector plate 3 and terminal plate 4 attached thereto is accommodated in metal case 5. At this moment, inner surface 205E of bottom plate 205B of case 5 has contacting portion 205J (a first contacting portion) contacting negative collector plate 3 and junction portion 5A (a first junction portion) facing negative collector plate 3. At this moment, the entire surface of junction portion 5A is located away from negative collector plate 3. Contacting portion 205J of inner surface 205E of bottom plate 205B into contacts negative collector plate 3 but is not joined to negative collector plate 3. After capacitor element 1 is put into metal case 5, laser is radiated to outer surface 205K of bottom plate 205B of metal case 5 so as to weld junction portion 5A to negative collector plate 3 at joining point 205G (a first joining point). That is, junction portion 5A includes joining point 205G joined to negative collector plate 3 and separation part 205P (a first separation part) around joining point 205G. Joining point 205G which is located away from contacting portion 205J. Separation part 205P faces negative collector plate 3 with gap G1 (a first gap) between separation part 205P and negative collector plate 3. Recess 205L is provided in outer surface 205K of bottom plate 205B opposite to junction portion 5A. Bottom 205M of recess 205L is located opposite to junction portion 5A. The thickness between junction portion 5A of inner surface 205E of bottom plate 205B and bottom 205M of recess 205L is smaller than the thickness between contacting portion 205J of inner surface 205E of bottom plate 205B and outer surface 205K. This structure allows joining point 205G of junction portion 5A to be easily welded and joined to negative collector plate 3 by the laser radiated to bottom 205M of recess 205L. Gap G1 releases a reactive force of hot metal vapor which is applied to hot metal liquid melted by the welding to an outside, thereby preventing the capacitor having open hole failure in case 5 and widening the selection of welding conditions. This stabilizes the welding conditions and avoids the open hole failure, hence preventing a resistance from increasing unintentionally and reliably connecting the electrodes.

Width t1 of gap G1 ranges preferably from 0.1 mm to 0.5 mm, more preferably from 0.1 mm to 0.3 mm. Width t1 smaller than 0.1 mm prevents sputters produced by the laser radiation from being released to outside. Width t1 exceeding 0.5 mm requires large power of the laser.

Figure 6:
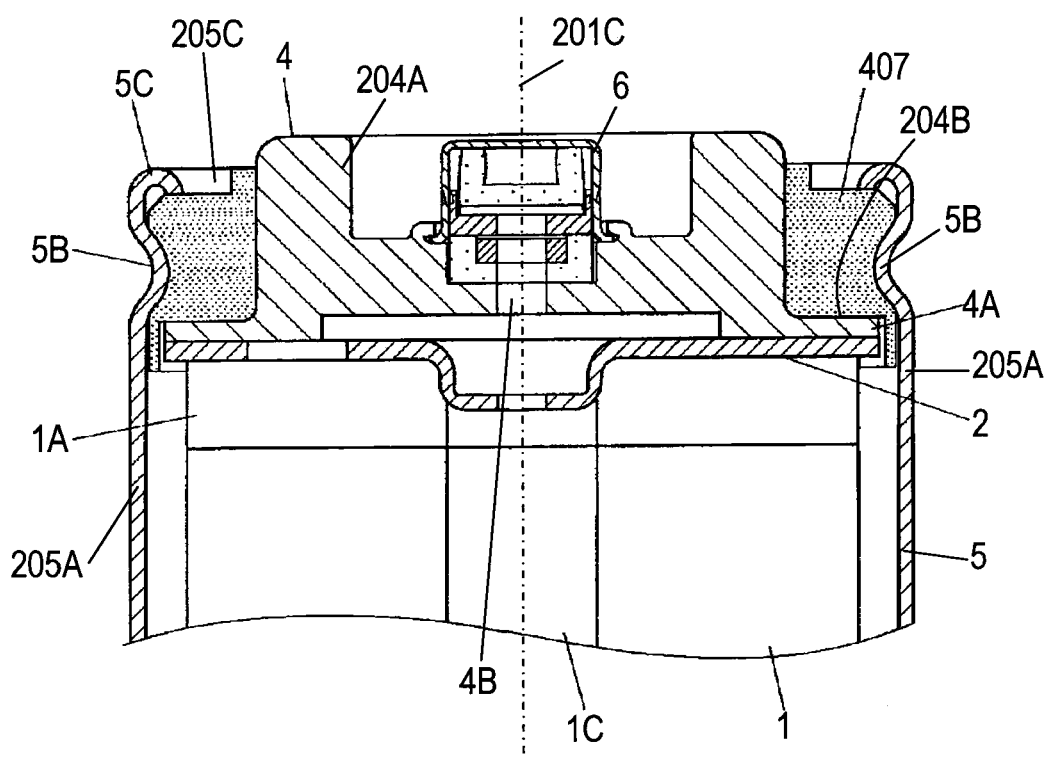
FIG. 6 is an enlarged cross-sectional view of the capacitor according to the embodiment.

FIG. 6 is an enlarged cross-sectional view of capacitor 1001 for illustrating a vicinity of terminal plate 4. Terminal plate 4 includes terminal portion 204A and flange 4A extending from a lower end of terminal portion 204A in parallel with positive collector plate 2. Terminal plate 4 is placed on positive collector plate 2, and then, laser is radiated to upper surface 204B of flange 4A for welding so as to join flange 4A mechanically and electrically to a periphery of positive collector plate 2. Terminal portion 204A has side surface 204C directed radially away from center axis 201C. Side surface 204C faces tubular portion 205A across sealing rubber 407.

While sealing rubber 407 placed on upper surface 204B of flange 4A, a portion near opening 205C of metal case 5 is shrunk from outside so as to form shrink portion 5B. Shrink portion 5B urges sealing rubber 407 toward center axis 201C so as to press and shrink sealing rubber 407 between side surface 204C of terminal portion 204A of terminal plate 4 and shrink portion 5B. Then, opening edge 205N surrounding opening 205C of metal case 5 is curled to form curling portion 5C. Curling portion 5C presses down an upper surface of sealing rubber 407 to seal terminal plate 4 and opening 205C of case 5.

Figure 7A:
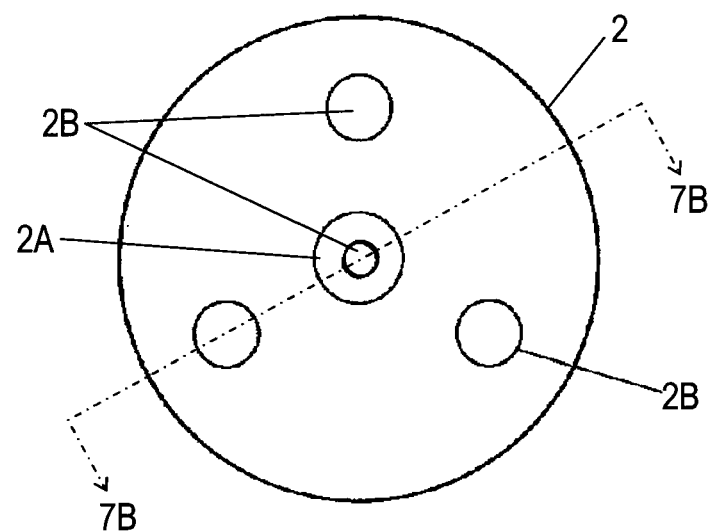
FIG. 7A is a plan view of a positive collector plate of the capacitor according to the embodiment.
Figure 7B:
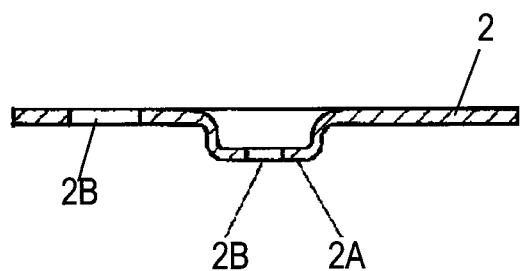
FIG. 7B is a cross-sectional view of the positive collector plate on line 7B-7B shown in FIG. 7A.

FIG. 7A is a plan view of positive collector plate 2. FIG. 7B is a cross-sectional view of positive collector plate 2 on line 7B-7B shown in FIG. 7A. Positive collector plate 2 has protrusion 2A fitting into hollow 1C of capacitor element 1 and plural holes 2B allowing electrolyte solution 201E to pass through.

Figure 8A:
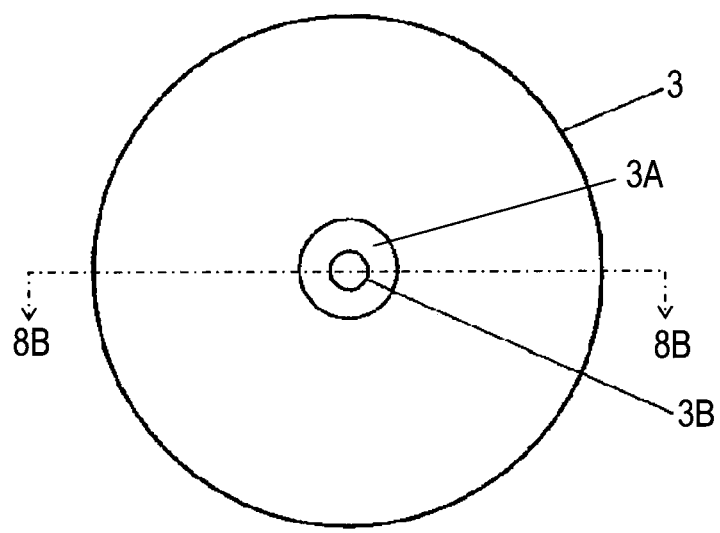
FIG. 8A is a plan view of a negative collector plate of the capacitor according to the embodiment.
Figure 8B:
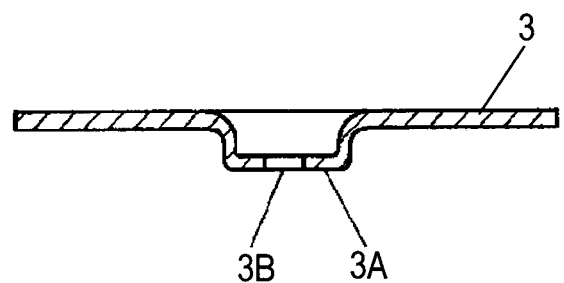
FIG. 8B is a cross-sectional view of the negative collector plate on line 8B-8B shown in FIG. 8A.

FIG. 8A is a plan view of negative collector plate 3. FIG. 8B is a cross-sectional view of negative collector plate 3 on line 8B-8B shown in FIG. 8A. Negative collector plate 3 has protrusion 3A fitting into hollow 1C of capacitor element 1, and has hole 3B therein allowing electrolyte solution 201E to pass through. Electrolyte solution 201E is put into capacitor element 1 through hole 4B provided in terminal plate 4 via holes 2B provided in positive collector plate 2. Therefore, the number of holes 2B provided in positive collector plate 2 is larger in the number of hole 3B provided in negative collector plate 3.

Figure 9A:
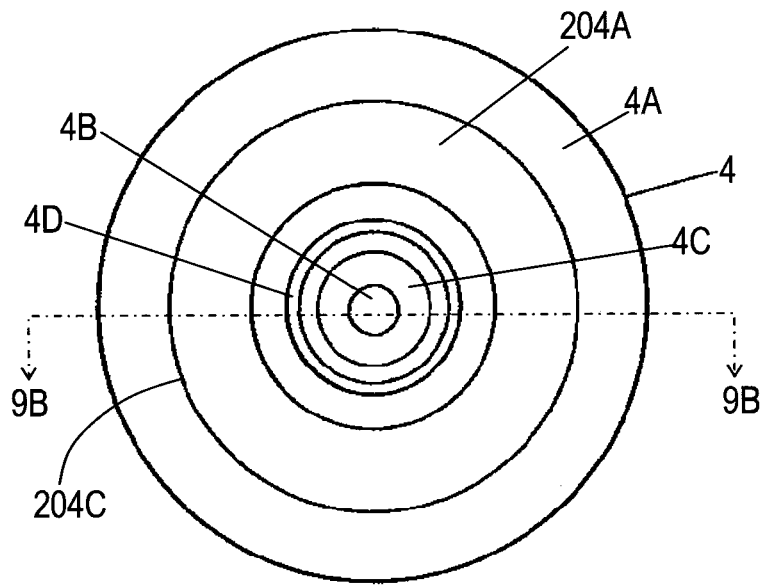
FIG. 9A is a plan view of a terminal plate of the capacitor according to the embodiment.
Figure 9B:
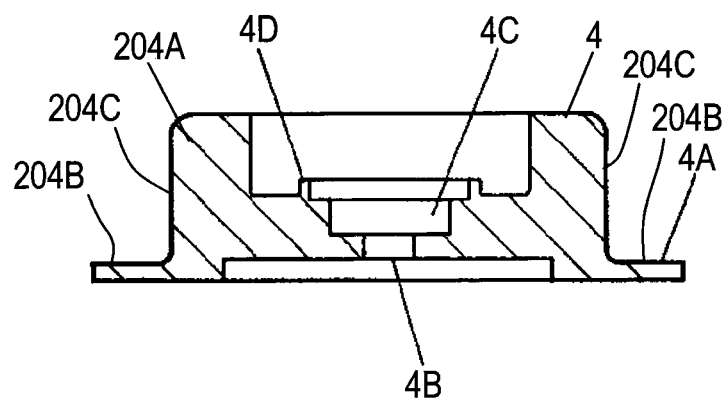
FIG. 9B is a cross-sectional view of the terminal plate on line 9B-B shown in FIG. 9A.

FIG. 9A is a plan view of terminal plate 4. FIG. 9B is a cross-sectional view of terminal plate 4 on line 9B-9B shown in FIG. 9A. Terminal portion 204A has recess 4C provided therein for mounting pressure regulation valve 6 into recess 4C. Protrusion 4D is bent after pressure regulation valve 6 is installed in recess 4C, thereby caulking and fixing pressure regulation valve 6 to terminal plate 4.

Figure 10A:
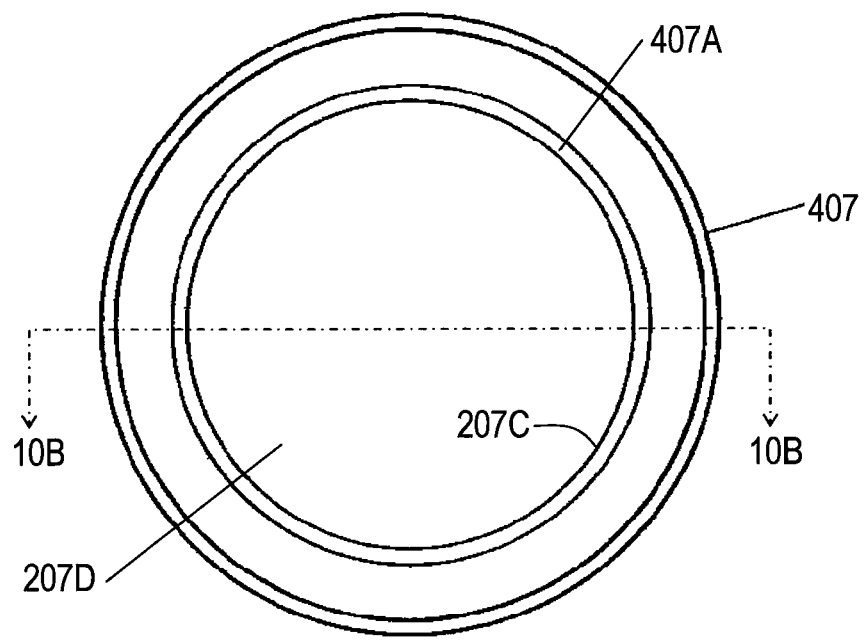
FIG. 10A is a plan view of a sealing rubber of the capacitor according to the embodiment.
Figure 10B:
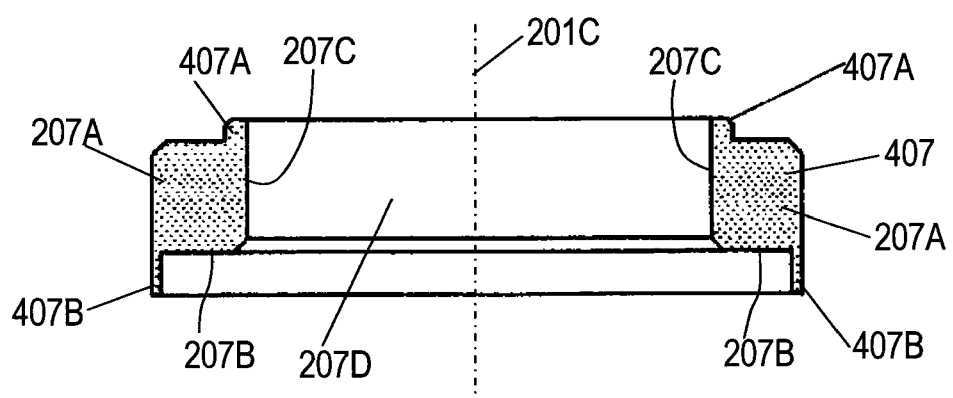
FIG. 10B is a cross-sectional view of the sealing rubber on line 10B-10B shown in FIG. 10A.

FIG. 10A is a plan view of sealing rubber 407. FIG. 10B is a cross-sectional view of the sealing rubber on line 10B-10B shown in FIG. 10A. Sealing rubber 407 is made of insulting rubber, butyl rubber according to this embodiment, but is not limited to it. As shown in FIGS. 10A and 10B, sealing rubber 407 has an annular shape. Sealing rubber 407 has sealing portion 207A located between side surface 204C of terminal portion 204A of terminal plate 4 and opening 205 of case 5 so as to seal opening 205C of case 5 and terminal plate 4. Sealing portion 207A has through-hole 207D having terminal portion 204A of terminal plate 4 passing through. Through-hole 207D has inner surface 207C contacting side surface 204C of terminal portion 204A. Sealing portion 207A has lower surface 207B contacting upper surface 204B of flange 4A of terminal plate 4. Sealing rubber 407 further has walls 407A and 407B both protruding from sealing portion 207A and having annular shapes. Wall 407A continued to inner surface 207C of through-hole 207D and protrudes from sealing portion 207A in parallel with center axis 201C away from capacitor element 1. Wall 407B has the annular shape and protrudes from an outer periphery of lower surface 207B of sealing portion 207A in parallel with center axis 201C and away from wall 407A. Wall 407A securely contacts side surface 204C of terminal portion 204A of terminal plate 4. Wall 407B securely contacts between an outer periphery of flange 4A of terminal plate 4 and tubular portion 205A and between an outer periphery of positive collector plate 2 and tubular portion 205A. Thus, wall 407B prevents flange 4A of terminal plate 4 from contacting tubular portion 205A of case 5, and prevents positive collector plate 2 from contacting tubular portion 205A. Sealing rubber 407 does not necessarily have both wall 407A and 407B, and may have only one of wall 407A and 407B.

Figure 11:
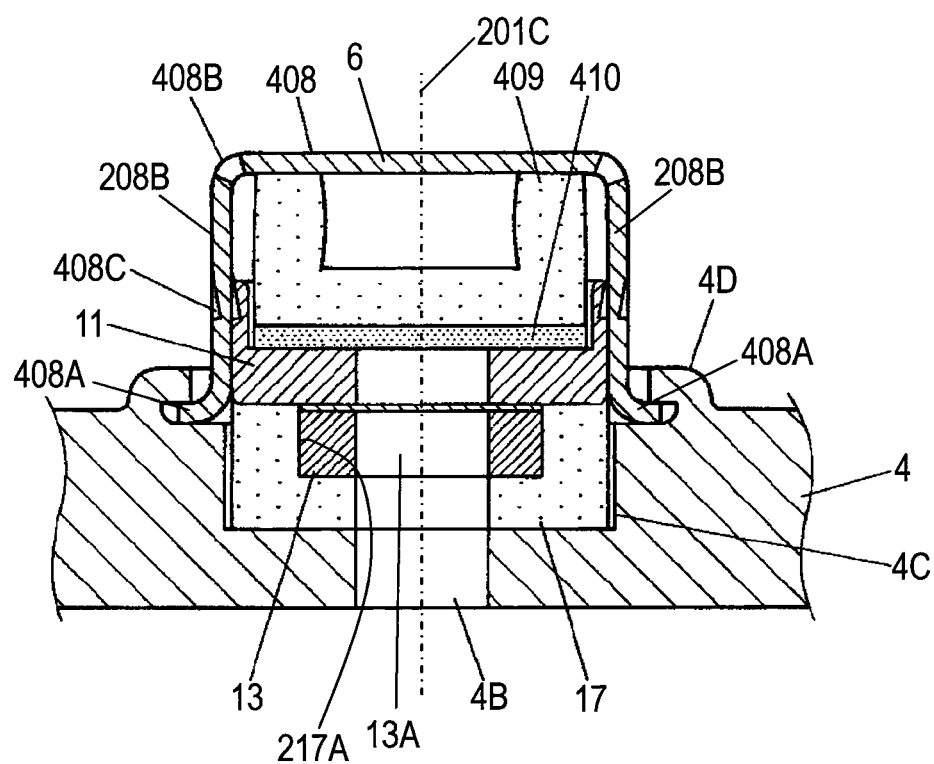
FIG. 11 is a cross-sectional view of a pressure regulation valve of the capacitor according to the embodiment.
Figure 12:
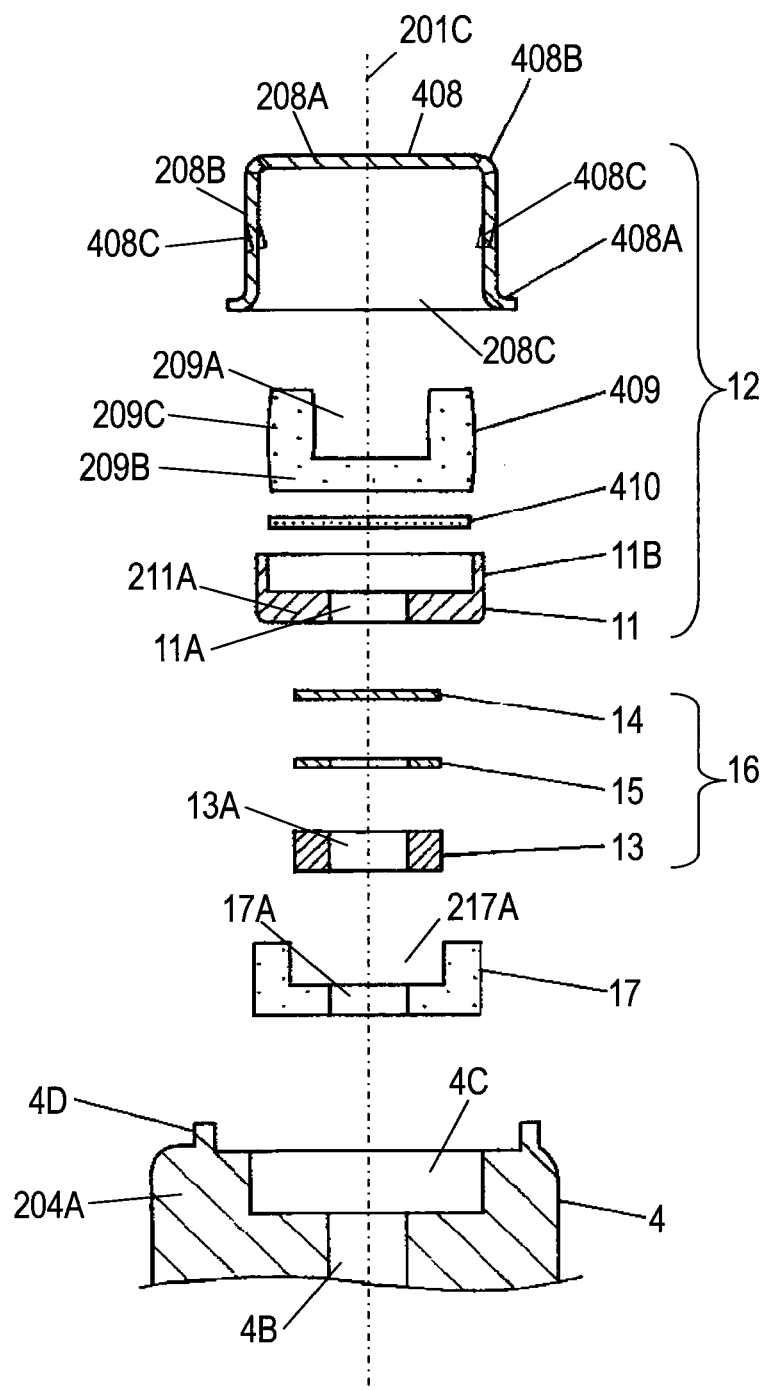
FIG. 12 is an exploded cross-sectional view of the pressure regulation valve of the capacitor according to the embodiment.

FIGS. 11 and 12 are a cross-sectional view and an exploded cross-sectional view of pressure regulation valve 6, respectively. Cap 408 made of metal, such as stainless steel, has bottom plate 208A, side wall 208B having a cylindrical shape extending from an outer periphery of bottom plate 208A along central axes 201C, and flange 408A protruding outward from opening edge 208C, a lower end of side wall 208B away from center axis 201C. Cap 408 has hole 408B communicating with outside. Valve body 409 made of silicon rubber has a cylindrical shape having recess 209A opening in an upper surface of valve body 409, and has bottom portion 209B and side wall 209O surrounding recess 209A. Packing 410 is made of butyl rubber. Bottom portion 209B of valve body 409 contacts packing 410. Washer 11 made of aluminum has washer body 211A and wall 11B unitarily formed with washer body 211A. Washer body 211A has an annular shape having hole 11A formed therein at a center thereof. Wall 11B has an annular shape extending an outer periphery of an upper surface of washer body 211A along center axis 201C. Protrusion 408C is provided on side wall 208B of cap 408 and protrudes toward an inside of cap 498. Protrusion 408C can be formed by cut a portion of side wall 208B and bending the portion to protrude toward an inside of cap 408.

While packing 410 is placed on an upper surface of washer body 211A to place bottom portion 209B of valve body 409 on packing 410, washer 11 is pressed into cap 408 with a jig, thereby providing valve unit 12. Valve body 409 and packing 410 are compressed in valve unit 12. Washer 11 is pressed into cap 408 with the jig, which can control a depth of penetration precisely. When washer 11 is pressed into cap 408, protrusion 408C of cap 408 penetrates washer 11, thereby fixing washer 11 to side wall 208B of cap 408 with a large strength.

Washer 13 made of aluminum has an annular shape having hole 13A therein at a central thereof. Gas-permeable sheet 14 has a circular shape and is made of porous film of polytetrafluoroethylene (PTFT). Gas-permeable sheet 14 and washer 13D are stacked and heated with denaturation polypropylene (PP) film 15 between them so as to heat-adhere gas-permeable sheet 14, denaturation PP film 15, and washer 13, thus providing filter holder 16 having a ring shape. Filter holder 16 is placed in recess 4C formed in terminal portion 204A of terminal plate 4. Hole 4B is formed in a bottom of recess 4C for putting electrolyte solution 201E (FIG. 1A).

Figure 13A:
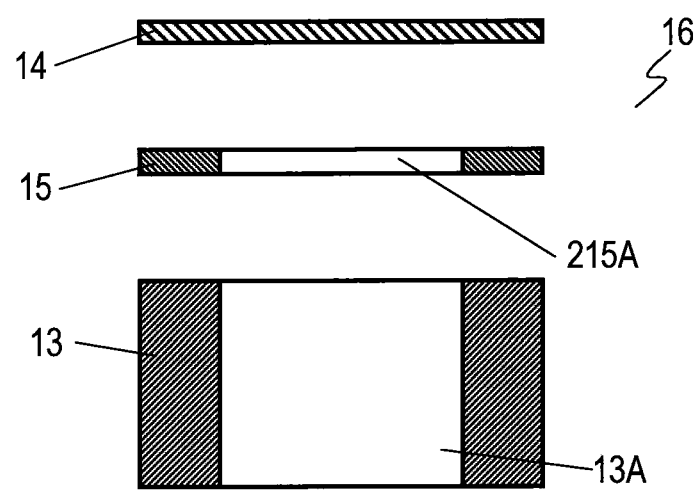
FIG. 13A is an exploded cross-sectional view of a filter holder of the pressure regulation valve of the capacitor according to the embodiment.
Figure 13B:
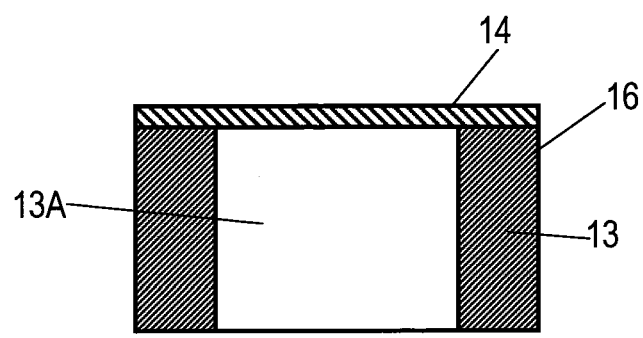
FIG. 13B is a cross-sectional view of the filter holder of the pressure regulation valve of the capacitor according to the embodiment.

FIGS. 13A and 13B are an exploded cross-sectional view and a cross-sectional view of filter holder 16 for illustrating a method of manufacturing filter holder 16. As shown in FIG. 13A, gas-permeable sheet 14 and washer 13 are stacked across denaturation PP film 15 between them, and heat-pressed for about 10 seconds at a temperature ranging from 140 to 200° C. under a pressure of 1kgf/cm². This process soaks denaturation PP of melted PP film 15 into gas-permeable sheet 14, as shown in FIG. 13B. Gas-permeable sheet 14 is joined to washer 13 by an anchor effect of the soaked denaturation PP. The denaturation PP film 15 has hole 15A matching with hole 13A of washer 13. In filter holder 16, the denaturation PP is not soaked into a portion of a surface of gas-permeable sheet 14 facing hole 13A of washer 13.

Holding rubber 17 has hole 17A therein at a center thereof. Recess 217A is formed in an upper surface of holding rubber 17 so that filter holder 16 may fit into recess 217A to allow gas-permeable sheet 14 to face hole 17A.

Holding rubber 17 is placed in recess 4C provided in the upper part of terminal plate 4. While filter holder 16 is placed in recess 217A of holding rubber 17, holding rubber 17 and filter holder 16 is pushed into terminal plate 4 with washer 11 of valve unit 12 so as to place flange 408A of cap 408 at a side of protrusion 4D of terminal plate 4. While flange 408A is placed at the side of protrusion 4D, protrusion 4D is bent and caulked for mechanically fixing flange 408A to terminal plate 4, providing pressure regulation valve 6. In the pressure regulation valve 6, holding rubber 17 is compressed and held to press and hold gas-permeable sheet 14 joined to filter holder 16.

An operation of pressure regulation valve 6 will be described below. When the pressure of gas produced in case 5 exceeds a predetermined value, the gas passes through gas-permeable sheet 14, and raises packing 410 and valve body 409, thus producing a space between packing 410 and washer 11. The gas passes through the space into cap 408 and then is discharged through hole 408B formed in cap 408. When the pressure of the gas in case 5 returns to a value lower than the predetermined value, packing 410 and valve body 409 which have been raised close hole 11A of washer 11, thus providing case 5 with air-tightness. Thus, pressure regulation valve 6 is a self restoring valve. Gas-permeable sheet 14 allows the gas to pass through it but does not allow electrolyte solution 210E to pass through it, hence preventing electrolyte solution 210E from leaking out of capacitor 1001.

As mentioned, valve unit 12 is manufactured precisely with the jig, and accordingly, reduces a variation in working conditions, such as a gas pressure, in which pressure regulation valve 6 operates, thus operating stably. Performance of valve unit 12 may be confirmed as a unit working for pressure regulation valve 6 before it is fixed to terminal plate 4. Valve body 409 made of silicone rubber is stacked on packing 410 made of butyl rubber, hence having a heat resistance.

Silicon rubber maintains elasticity in high and low temperature environment but is inferior low in water-shielding performance. Since butyl rubber has a high water-shielding performance, packing 410 made of butyl rubber which is placed on a lower surface valve body 409, i.e., closer to an inside of case 5 than valve body 409 is provides valve unit 12 with a high water-shielding performance.

In order to increase working reliability of pressure regulation valve 6, a surface of valve body 409 made of silicon rubber may be coated with polyparaxylylene to attach valve body 409 made of silicon rubber securely onto packing 410 made of butyl rubber.

Valve body 409 made of silicon rubber may be previously adhered onto packing 410 made of butyl rubber with a double-sided adhesive tape, thereby allowing valve unit 12 to be manufactured easily.

Valve body 409 may be made of fluoro-rubber having a superior low temperature characteristic, although it is expensive. This material allows valve body 409 to close hole 11A directly without packing 410 made of butyl rubber to provide the high temperature performance, the low temperature performance, and the water-shielding performance.

In order to keep a high thermal resistance, valve unit 12 includes valve body 409 made of silicon rubber and packing 410 made of butyl rubber. However, if an ordinary heat resistance is acceptable, valve unit 12 may directly close hole 11A with valve body 409 made of butyl rubber without using packing 410 made of butyl rubber.

Figure 14:
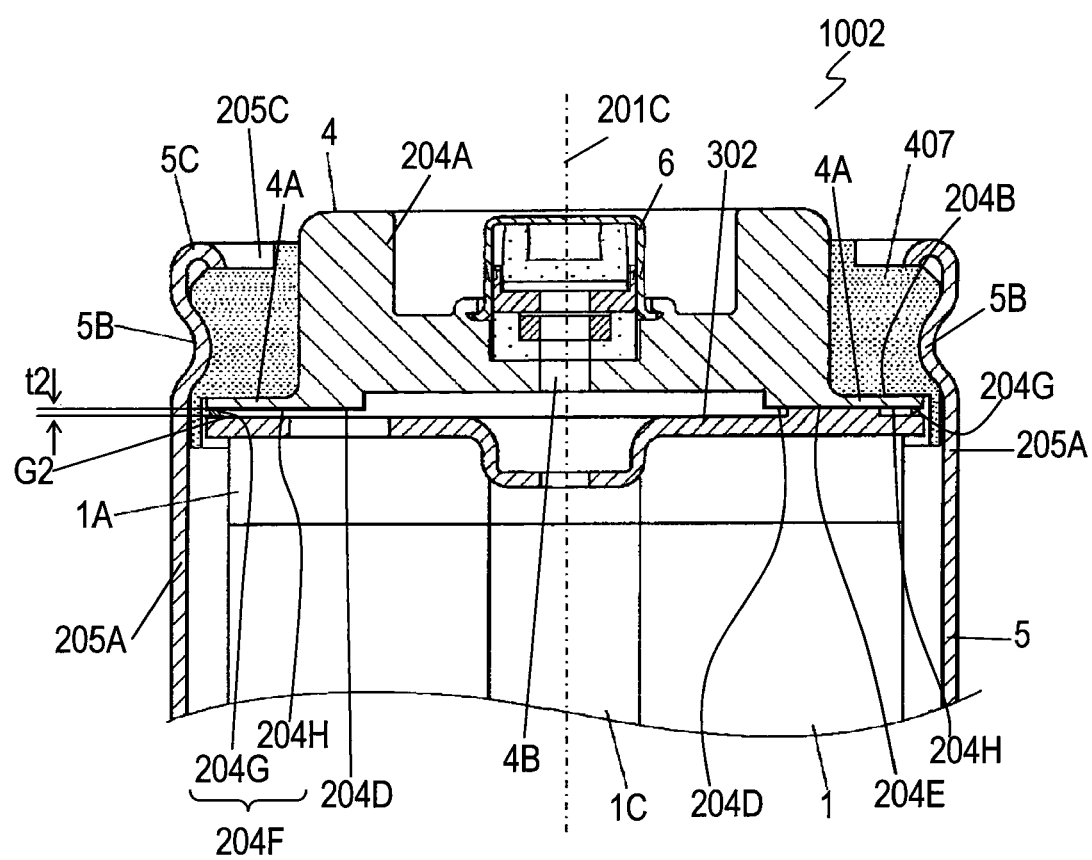
FIG. 14 is an expanded cross-sectional view of another capacitor according to the embodiment.
Figure 15A:
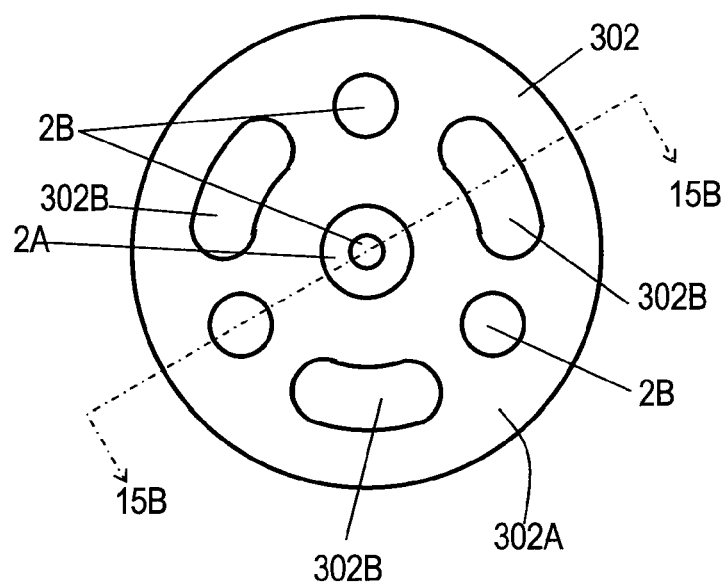
FIG. 15A is a plan view of a positive collector plate of the capacitor shown in FIG. 14.
Figure 15B:
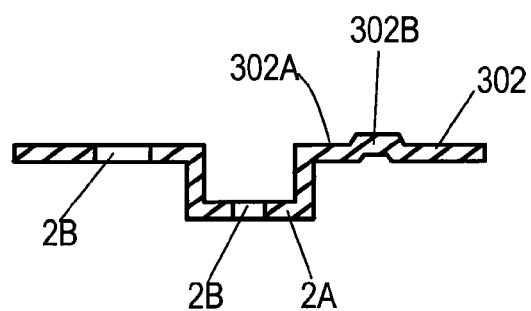
FIG. 15B is a cross-sectional view of the positive collector plate on line 15B-15B shown in FIG. 15A.
Figure 16:
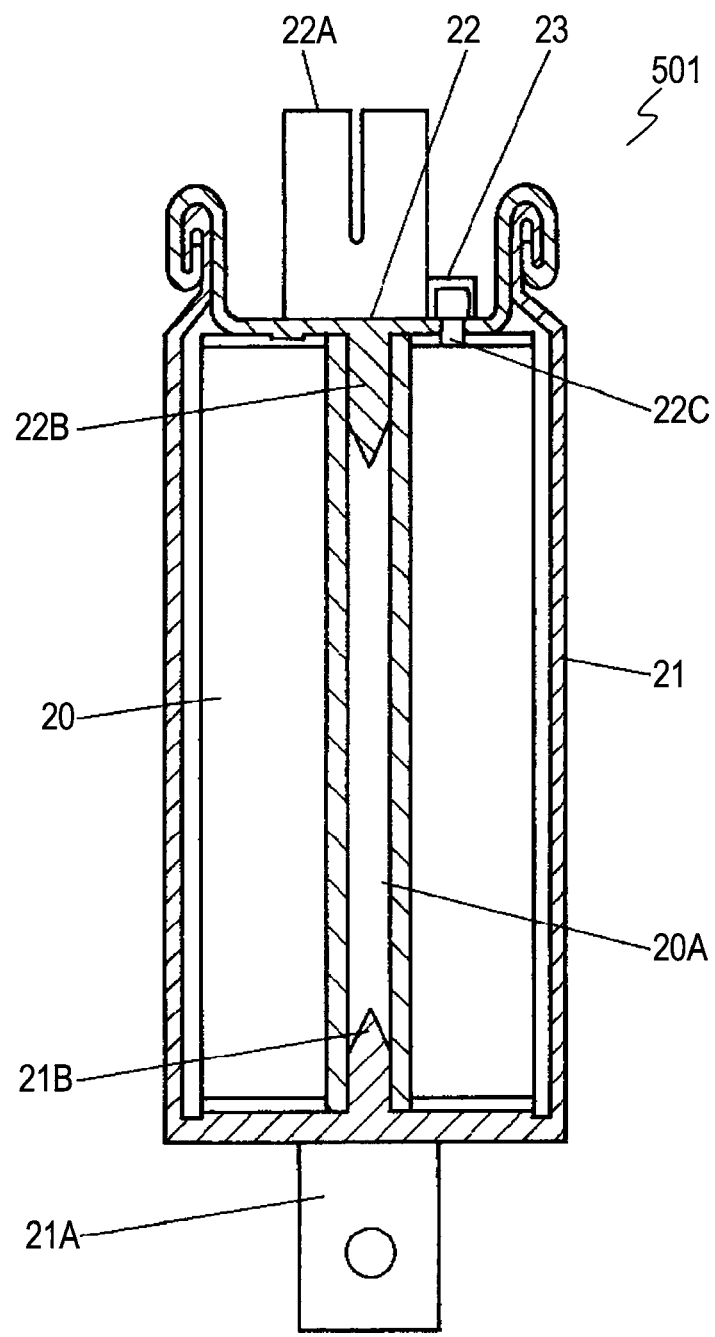
FIG. 16 is a cross-sectional view of a conventional capacitor.
Figure 17:
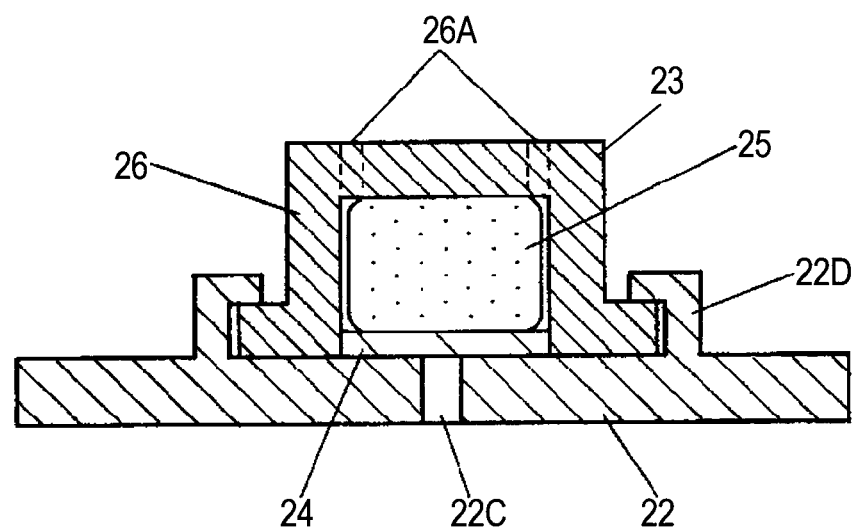
FIG. 17 is a cross-sectional view of a pressure regulation valve of the conventional capacitor.

FIG. 14 is an enlarged cross-sectional view of another capacitor 1002 in accordance with the embodiment. In FIG. 14, components identical to those of capacitor 1001 shown in FIG. 6 are denoted by the same reference numerals. Capacitor 1002 shown in FIG. 14 includes positive collector plate 302 instead of positive collector plate 2 shown in FIGS. 1 to 4. FIG. 15A is a plan view of positive collector plate 302. FIG. 15B is a cross-sectional view of positive collector plate 302 on line 15B-15B shown in FIG. 15A. In FIGS. 15A and 15B, components identical to those of positive collector plate 2 are denoted by the same reference numerals. Positive collector plate 302 has protrusion 302B protruding from outer surface 302A. Terminal plate 4 has inner surface 204D facing an inside of case 5 and facing positive collector plate 302. Inner surface of terminal plate 4 has contacting portion 204E (a second contacting portion) contacting protrusion 302B of positive collector plate 302 and junction portion 204F (a second junction portion) facing positive collector plate 302. Before terminal plate 4 is joined to positive collector plate 302, the entire surface of junction portion 204F is located away from positive collector plate 302. Contacting portion 204E contacts protrusion 302B of positive collector plate 302 but is not joined to protrusion 302B. Junction portion 204F is located away from positive collector plate 302. Laser is radiated to upper surface (outer surface) 204B of flange 4A of terminal plate 4 to weld and join terminal plate 4 to junction portion 204F at joining point 204G (a second joining point). That is, junction portion 204F includes joining point 204G contacting positive collector plate 302 and separation part 204H (a second separation part) facing positive collector plate 302 around joining point 204G across gap G2 (a second gap) having width t2. Joining point 204G is located away from contacting portion 204E. Gap G2 has the same effect as gap G1 shown in FIGS. 5A and 5B. However, since inner surface 204D of terminal plate 4 and positive collector plate 302 are connected by laser-welding flange 4A to an outer periphery of positive collector plate 302, a reactive force of hot metal vapor applied to hot metal liquid melted by the welding is mostly released to an outside. Therefore, gap G2 is not necessarily provided.

According to the embodiment, the recess is formed in inner surface 205E of bottom plate 205B of case 5 so as to provide gap G1 between junction portion 5A and negative collector plate 3. Gap G1 can be formed with a recess provided in a surface of positive collector 3 facing bottom plate 205B.

In capacitors 1001 and 1002 according to the embodiment, collector plate 2, 3, and 302 and terminal plate 4 are referred to by terms, such as "positive electrode" or "negative electrode", indicating a polarity. The polarity may be reversed or even non polarity is allowed.

In capacitors 1001 and 1002 according to the embodiment, collector plate 3 and case 5 are joined reliably, preventing unwanted resistance to be caused. Consequently, the capacitors are useful for automotive application where a high reliability is required.

What is claimed is:

1. A capacitor comprising:
    a capacitor element including a first electrode;
    an electrolyte;
    a first collector plate made of metal and joined to the first electrode of the capacitor element; and
    a case made of metal accommodating the capacitor element, the electrolyte, and the first collector plate, the case having a tubular portion having an opening and a bottom plate closing the tubular portion, wherein
    an inner surface of the bottom plate of the case has a first contacting portion contacting the first collector plate and a first junction portion facing the first collector plate, and
    the first junction portion of the inner surface of the bottom plate has a first joining point joined to the first collector plate and a first separation part facing the first collector plate around the first joining point by a first gap between the first separation part and the first collector plate, the first joining point being located away from the first contacting portion.

2. The capacitor according to claim 1, wherein
    the inner surface of the bottom plate of the case has a recess provided therein,
    the inner surface of the bottom plate of the case includes a bottom of the recess and a surface portion which is provided around the recess and is connected to the recess,
    the bottom of the recess serves as the separation portion of the first junction portion, and
    the surface portion of the inner surface of the bottom plate serves as the first contacting portion.

3. The capacitor according to claim 1, wherein a thickness of a portion of the bottom plate of the case corresponding to the contact portion is larger than a thickness of a portion of the bottom plate of the case corresponding to the first junction portion.

4. The capacitor according to claim 1, wherein the first gap has a width ranging from 0.1 mm to 0.5 mm.

5. The capacitor according to claim 1, wherein the first joining point is formed by laser welding.

6. The capacitor according to claim 1, further comprising a terminal plate placed at the opening of the case, wherein
    the capacitor element has a first end surface and a second end surface opposite to each other,
    the first electrode of the capacitor element is provided at the first end surface,
    the capacitor element further includes a second electrode provided at the second end surface, the second electrode being connected electrically to the terminal plate.

7. The capacitor according to claim 6, further comprising a second collector plate made of metal and joined to the second electrode of the capacitor element, wherein
    the terminal plate is placed at the opening of the case and joined to the second collector plate.

8. The capacitor according to claim 7, further comprising
    an inner surface of the terminal plate facing an inside of the case having a second contacting portion contacting the second collector plate and a second junction portion facing the second collector plate, and
    the second junction portion of the inner surface of the bottom plate having a second joining point joined to the second collector plate and a second separation part facing the second collector plate around the second joining point by a second gap between the second separation part and the second collector plate, the second joining point being located away from the second contacting portion.

9. The capacitor according to claim 8, wherein the second gap has a width ranging from 0.1 mm to 0.5 mm.

10. The capacitor according to claim 8, wherein the second joining point is formed by laser welding.

11. The capacitor according to claim 7, further comprising a sealing rubber sealing the terminal plate and the opening of the case.

12. A method of manufacturing a capacitor comprising:
    providing a capacitor element including a first electrode;
    providing a case made of metal and having a tubular portion having an opening and a bottom plate closing the tubular portion;
    joining a collector plate made of metal to the first electrode of the capacitor element;
    after said joining the collector plate, accommodating the capacitor element in the case, such that an inner surface of the bottom plate of the case has a contacting portion contacting the collector plate and a junction portion facing the collector plate by a gap between the junction portion and the collector plate;
    joining the junction portion of the inner surface of the bottom plate of the case to the collector plate by welding the junction portion at a joining point; and
    putting an electrolyte into the case.

13. The method according to claim 12, wherein said joining the junction portion to the collector plate comprises joining the junction portion of the inner surface of the bottom plate of the case to the collector plate by welding the junction portion to the collector plate at the joining point with laser.

14. The method according to claim 13, wherein said joining the junction portion to the collector plate comprises joining the junction portion to the collector plate by welding the junction portion at the joining point by radiating laser from an outer surface of the bottom plate of the case opposite to the junction portion.

15. The method according to claim 12, wherein
    the inner surface of the bottom plate of the case has a recess provided therein,
    the inner surface of the bottom plate of the case includes a bottom of the recess and a surface portion which is provided around the recess and is connected to the recess,
    the bottom of the recess serves as the separation portion of the junction portion, and
    the surface portion of the inner surface of the bottom plate serves as the contacting portion.

16. The method according to claim 12, wherein a thickness of a portion of the bottom plate of the case corresponding to the contact portion is larger than a thickness of a portion of the bottom plate of the case corresponding to the junction portion.

17. The method according to claim 12, wherein
    the capacitor element has a first end surface and a second end surface opposite to each other,
    the first electrode is provided at the first end surface,
    the capacitor element further includes a second electrode provided at the second end surface,
    said method further comprising:
    providing a terminal plate at the opening of the case and connecting the terminal plate electrically to the second collector plate.

* * * * *